(12) United States Patent
Walls et al.

(10) Patent No.: US 9,699,031 B2
(45) Date of Patent: Jul. 4, 2017

(54) CLOUD MODELS BASED ON LOGICAL NETWORK INTERFACE DATA

(71) Applicant: Hewlett-Packard Enterprise Development LP, Houston, TX (US)

(72) Inventors: Jeffrey Joel Walls, Fort Collins, CO (US); Mark Perreira, Sunnyvale, CA (US); Jayashree Sundarachar Beltur, Sunnyvale, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 147 days.

(21) Appl. No.: 14/821,127

(22) Filed: Aug. 7, 2015

(65) Prior Publication Data
US 2017/0041192 A1 Feb. 9, 2017

(51) Int. Cl.
*G06F 15/173* (2006.01)
*H04L 12/24* (2006.01)
*H04L 29/08* (2006.01)

(52) U.S. Cl.
CPC ...... *H04L 41/0853* (2013.01); *H04L 41/0806* (2013.01); *H04L 67/10* (2013.01)

(58) Field of Classification Search
CPC ..... H04L 67/10; H04L 67/1097; H04L 41/12; H04L 67/16; H04L 41/0806
See application file for complete search history.

(56) References Cited

U.S. PATENT DOCUMENTS

| 8,335,236 | B2 | 12/2012 | Dhar et al. | |
|---|---|---|---|---|
| 9,584,363 | B1* | 2/2017 | Olson | H04L 41/0668 |
| 2010/0046537 | A1* | 2/2010 | Perlmutter | H04L 47/125 370/419 |
| 2010/0115174 | A1* | 5/2010 | Akyol | G06F 13/385 710/316 |
| 2011/0176421 | A1* | 7/2011 | Perlmutter | H04L 47/125 370/235 |

(Continued)

OTHER PUBLICATIONS

Huawei Technologies Co., Ltd., "White Paper for Microsoft Private Cloud Fast Track on Huawei Server and Storage System," (Research Paper), Jun. 21, 2013, 43 pps.

(Continued)

*Primary Examiner* — Peling Shaw
(74) *Attorney, Agent, or Firm* — Hewlett Packard Enterprise Patent Department

(57) ABSTRACT

Examples relate to cloud models based on logical network interface data. Some examples disclosed herein may enable obtaining first cloud definition data that describes a first cloud infrastructure. The first cloud definition data may comprise logical network interface data that describes a first set of network interfaces to be bonded to form a first logical network interface for the first cloud infrastructure. Some examples further enable generating a first cloud model based on the first cloud definition data. The first cloud model may comprise first cloud configuration data that, when executed, causes the first cloud infrastructure to be deployed. Some examples further enable storing a first checkpoint image of the first cloud model. The first checkpoint image may comprise at least a portion of the first cloud configuration data.

19 Claims, 5 Drawing Sheets

(56) References Cited

U.S. PATENT DOCUMENTS

| | | | |
|---|---|---|---|
| 2012/0254862 A1* | 10/2012 | Dong | G06F 9/4856 |
| | | | 718/1 |
| 2014/0269432 A1 | 9/2014 | Goyal et al. | |
| 2014/0280821 A1* | 9/2014 | Maitland | H04L 41/0668 |
| | | | 709/223 |
| 2014/0298091 A1* | 10/2014 | Carlen | H04L 65/80 |
| | | | 714/15 |
| 2014/0372576 A1 | 12/2014 | Mohandas et al. | |
| 2015/0201046 A1* | 7/2015 | Biswas | H04L 69/321 |
| | | | 370/329 |
| 2015/0277856 A1* | 10/2015 | Payne | G06F 7/58 |
| | | | 708/255 |
| 2016/0006687 A1* | 1/2016 | Tsirkin | H04L 69/324 |
| | | | 370/392 |
| 2016/0019176 A1* | 1/2016 | Challa | G06F 9/45558 |
| | | | 710/117 |
| 2016/0112350 A1* | 4/2016 | Morrison | H04L 49/557 |
| | | | 370/218 |
| 2016/0239392 A1* | 8/2016 | Deng | G06F 11/2007 |
| 2016/0283879 A1* | 9/2016 | Behrendt | G06Q 10/0633 |

OTHER PUBLICATIONS

Let Us Explain, "Step by Step XCP NIC Teaming / Bonding Configuration," (Research Paper), Jul. 26, 2013, 19 pages.

\* cited by examiner

CLOUD MODELS BASED ON LOGICAL NETWORK INTERFACE DATA

BACKGROUND

Computing infrastructure service providers such as cloud service providers offer Internet-based computing where shared resources are provided to users as a service. Cloud computing, for example, enables provisioning of dynamically scalable and often virtualized resources on demand.

BRIEF DESCRIPTION OF THE DRAWINGS

The following detailed description references the drawings, wherein.

DETAILED DESCRIPTION

Figure 1:
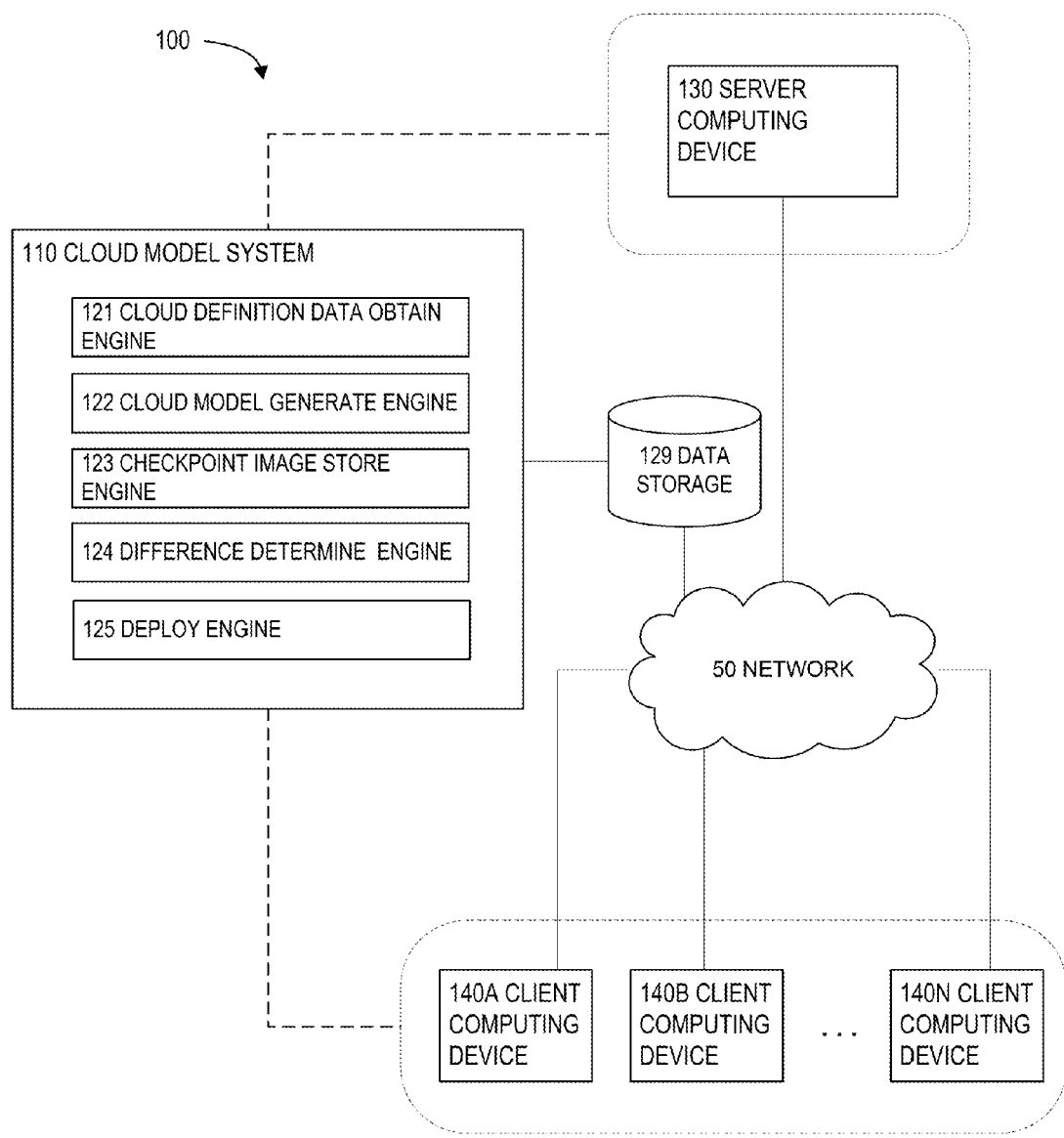
FIG. 1 is a block diagram depicting an example environment in which various examples may be implemented as a cloud models system.

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

Computing infrastructure service providers such as cloud service providers offer network-based computing where shared resources are provided to users as a service. Cloud computing, for example, enables provisioning of dynamically scalable and often virtualized resources on demand. A cloud infrastructure may describe various cloud components (e.g., networks, compute nodes, storage nodes, etc.) and their relationships in a cloud environment. As such, the cloud infrastructure, when successfully deployed, may set up the various cloud components according to the infrastructure in the cloud environment. The shared resources may be provisioned on demand from the cloud having the cloud infrastructure.

However, once the cloud infrastructure is deployed, it may be challenging to fix any unintended configurations of cloud components or otherwise modify the configurations because it would require deploying a whole new cloud infrastructure with the modified configurations. In addition, in order to deploy the new cloud infrastructure, the access to the cloud (having the original cloud infrastructure) may be blocked while the new cloud infrastructure is being deployed and become fully operational.

Examples disclosed herein may provide technical solutions to such challenges by creating multiple what-if scenarios to simulate various different cloud infrastructures before deploying any one of them. A cloud architect may review, compare, and/or validate different scenarios and/or make a determination as to which scenario should be used for the actual deployment. These scenarios may be referred to herein as "cloud models." A cloud model may be generated based on cloud definition data that describes a particular cloud infrastructure. In some implementations, the cloud definition data may comprise logical network interface data. The logical network interface data may describe a set of network interfaces (e.g., physical network interface cards (NICs)) to be bonded to form a single logical network interface. Such bonding techniques such as NIC bonding or teaming may be used as a way to increase bandwidth available for just a single NIC, for example. In this way, the configuration and/or deployment of the bonded network interfaces can be simplified. Further, multiple cloud models may be generated based on different logical network interface data to simulate various different network configurations.

Some examples disclosed herein may enable obtaining first cloud definition data that describes a first cloud infrastructure. The first cloud definition data may comprise logical network interface data that describes a first set of network interfaces to be bonded to form a first logical network interface for the first cloud infrastructure. Some examples further enable generating a first cloud model based on the first cloud definition data. The first cloud model may comprise first cloud configuration data that, when executed, causes the first cloud infrastructure to be deployed. Some examples further enable storing a first checkpoint image of the first cloud model. The first checkpoint image may comprise at least a portion of the first cloud configuration data.

The terminology used herein is for the purpose of describing particular embodiments only and is not intended to be limiting. As used herein, the singular forms "a," "an," and "the" are intended to include the plural forms as well, unless the context clearly indicates otherwise. The term "plurality," as used herein, is defined as two or more than two. The term "another," as used herein, is defined as at least a second or more. The term "coupled," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

FIG. 1 is an example environment 100 in which various examples may be implemented as a cloud models system 110. Environment 100 may include various components including server computing device 130 and client computing devices 140 (illustrated as 140A, 140B, . . . , 140N). Each client computing device 140A, 140B, . . . , 140N may communicate requests to and/or receive responses from server computing device 130. Server computing device 130 may receive and/or respond to requests from client computing devices 140. Client computing devices 140 may be any type of computing device providing a user interface through which a user can interact with a software application. For example, client computing devices 140 may include a laptop computing device, a desktop computing device, an all-in-one computing device, a tablet computing device, a mobile phone, an electronic book reader, a network-enabled appliance such as a "Smart" television, and/or other electronic device suitable for displaying a user interface and processing user interactions with the displayed interface. While server computing device 130 is depicted as a single computing device, server computing device 130 may include any number of integrated or distributed computing devices serving at least one software application for consumption by client computing devices 140.

The various components (e.g., components 129, 130, and/or 140) depicted in FIG. 1 may be coupled to at least one other component via a network 50. Network 50 may comprise any infrastructure or combination of infrastructures that enable electronic communication between the components. For example, network 50 may include at least one of the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. According to various implementations, cloud models system 110 and the various components described herein may be implemented in hardware and/or a combination of hardware and programming that configures hardware. Furthermore, in FIG. 1 and other Figures described herein, different numbers of components or entities than depicted may be used.

Cloud models system 110 may comprise cloud definition data obtain engine 121, cloud model generate engine 122, checkpoint image store engine 123, difference determine engine 124, a deploy engine 125, and/or other engines. The term "engine", as used herein, refers to a combination of hardware and programming that performs a designated function. As is illustrated respect to FIGS. 3-4, the hardware of each engine, for example, may include one or both of a processor and a machine-readable storage medium, while the programming is instructions or code stored on the machine-readable storage medium and executable by the processor to perform the designated function.

Cloud definition data obtain engine 121 may obtain cloud definition data that describe a particular cloud infrastructure. For example, cloud definition data obtain engine 121 may obtain first cloud definition data that describe a first cloud infrastructure, second cloud definition data that describe a second cloud infrastructure, third cloud definition data that describe a third cloud infrastructure, and so on.

"Cloud definition data," as used herein, may comprise network topology (e.g., a network architecture of physical and/or virtual networks including management network, Intelligent Platform Management Interface (IPMI) network, service network, storage network, external network, etc.), node lists (e.g., a list of physical and/or virtual servers including compute nodes, storage nodes, network nodes, etc.), operating systems, Application Program Interfaces (APIs), software applications, and/or other information that describe a particular cloud infrastructure. In some implementations, the cloud definition data may specify and/or include at least one control plane and/or at least one data plane. A control plane may comprise a set of networks, nodes, APIs, applications, etc. and may provide tasks such as provisioning, policy management, and/or monitoring to the underlying resources on a data plane.

In some implementations, the cloud definition data may comprise logical network interface data. The logical network interface data may describe a set of network interfaces (e.g., more than one physical network interface card (NIC)) to be bonded to form a single logical network interface. For example, a server node may have a set of physical network interfaces. A "server node," as used herein, may represent a physical server device that is available for deployment. At least two of the set of physical network interfaces may be bonded to form a single logical network interface. Bonding (also known as teaming, port trunking, link aggregation, among other names) means combining several network interfaces to a single link to provide increased bandwidth availability, load-balancing, maximum throughput, or a combination thereof. Any bonding techniques such as NIC bonding or teaming may be used to combine these network interfaces.

For example, a bonded network interface can increase data throughput by load balancing or provide redundancy by allowing failover from one physical network interface to another network interface. A bonded interface is perceived by the server node as an actual physical network interface. In one example, the bonded interface may send out network packets over the available physical network interfaces (that are part of the bonded interface) by using a simple round-robin scheduler. Different bond modes other than the round-robin mode as discussed above may be used to alter the behavior of load-balancing and/or failover.

Instead of having to change the bonding configurations for every server nodes to be deployed one by one, the desired bonding configurations may be specified in the logical network interface data for multiple server nodes. For example, the logical network interface data may describe a first set of network interfaces to be bonded to form a first logical network interface, a second set of network interfaces to be bonded to form a second logical network interface, a third set of network interfaces to be bonded form a third logical network interface, and so on. For example, the logical network interface data may specify that the NICs named "eth0" and "eth1" should be bonded and the NICs named "eth2," "eth3," and "eth4" should be bonded in the cloud infrastructure to be deployed.

In some implementations, the logical network interface data may further specify a bond mode for the set of network interfaces to be bonded together. As discussed above, the bond mode may include: a simple round-robin mode (e.g., the mode transmits network packets in sequential order from the first available physical NIC through the last), active-backup mode (e.g., one physical NIC is active among a bonded logical network interface. If the active NIC fails, a different NIC becomes active), XOR mode (e.g., the mode transmits network packets on selectable hashing algorithm), broadcast mode (e.g., the mode transmits network packets to all of the physical NICs in a bonded logical network interface), or other modes. The logical network interface data may further specify other parameters related to the bonding.

In some implementations, a user may want to modify or otherwise update the cloud definition data. For example, the logical network interface data may be updated such that which network interfaces should be bonded, a bond mode associated with it is modified. In another example, the logical network interface data may be updated such that the updated logical network interface data describes another set of network interfaces to be bonded that was not included in the original logical network interface data. Similarly, the bonded network interface defined in the original logical network interface data may be removed from the original logical network interface data.

The cloud definition data may be defined and/or obtained in various ways. For example, at least a portion of the cloud definition data may be defined or otherwise provided by a customer based on its requirements for cloud usage. In another example, at least a portion of the cloud definition data may be defined or otherwise provided by a cloud architect who designs the cloud infrastructure based on the customer requirements.

Cloud definition data obtain engine 121 may validate the cloud definition data based on a set of predetermined validation rules. For example, cloud definition data obtain engine 121 may validate the format, the completeness, and/or the accuracy or correctness of the cloud definition data. Cloud definition data obtain engine 121 may determine whether to change any portion of the cloud definition data based on the results of the validation. For example, a list of incorrect or missing values of the customer-provided requirements may be generated during the validation and/or may be used to update and/or correct the identified values in the cloud definition data. In some instances, the cloud definition data may be manually validated by a user (e.g., a cloud architect or other human inspectors).

In some implementations, a user (e.g., a cloud architect) may want to create multiple what-if scenarios to simulate various different cloud infrastructures before deploying any one of them. The user may review, compare, and/or validate different scenarios and/or make a determination as to which scenario should be used for the actual deployment. These scenarios may be referred to herein as "cloud models" (e.g., as discussed herein with respect to cloud model generate engine 122).

Cloud model generate engine 122 may generate a cloud model based on the cloud definition data (e.g., obtained by cloud definition data obtain engine 121) that describe the particular cloud infrastructure. The cloud model may comprise cloud configuration data that, when executed, cause the cloud infrastructure to be deployed. For example, the cloud definition data may be translated and/or converted into the cloud configuration data that can be used for the deployment of the particular cloud infrastructure. "Cloud configuration data," as used herein, may comprise a set of artifacts that are suitable for the deployment of the cloud infrastructure. For example, the artifacts may represent executable code that, when executed, builds and/or deploys the particular cloud infrastructure including the networks, nodes, software applications, and/or other components described by the cloud definition data. The set of artifacts may include but not be limited to a network artifact, a configuration management artifact, and/or a monitoring artifact (e.g., that may be used to build a monitoring system that monitors, logs, and/or audits the cloud infrastructure). The cloud configuration data may therefore include artifacts related to the bonding configurations defined in the logical network interface data (as discussed herein with respect to cloud definition data obtain engine 121). When these artifacts are executed to deploy the particular cloud infrastructure, the deployed cloud may have network interfaces to be bonded according to the logical network interface data.

Note that a plurality of cloud models may be generated based on different sets of cloud definition data. For example, cloud model generate engine 122 may generate a first cloud model based on the first cloud definition data, a second cloud model based on the second cloud definition data, a third cloud model based on the third cloud definition data, and so on. The first cloud model may comprise first cloud configuration data that, when executed, cause the first cloud infrastructure to be deployed, the second cloud model may comprise second cloud configuration data that, when executed, cause the second cloud infrastructure to be deployed, the third cloud model may comprise third cloud configuration data that, when executed, cause the third cloud infrastructure to be deployed, and so on.

In some implementations, the second cloud definition data (e.g., the second logical network interface data) may be created by modifying or otherwise updating the first cloud definition data (e.g., the first logical network interface data), as discussed herein with respect to cloud definition data obtain engine 121. For example, the first logical network interface data may be updated such that which network interfaces should be bonded and/or a bond mode associated with it is modified. In another example, the first logical network interface data may be updated such that the second logical network interface data describes another set of network interfaces to be bonded that was not included in the first logical network interface data. Similarly, the bonded network interface defined in the first logical network interface data may be removed from the first logical network interface data.

Cloud model generate engine 122 may modify the cloud model during validation of the cloud model. Cloud model generate engine 122 may validate the cloud model based on a set of predetermined validation rules. For example, cloud model generate engine 122 may validate the format, the completeness, and/or the accuracy or correctness of the cloud model. In some instances, the cloud model may be manually validated by a user (e.g., a cloud architect or other human inspectors). In some implementations, cloud model generate engine 122 may generate a graphical representation (e.g., ASCII diagram) of the cloud model. The graphical representation of the cloud model may be presented to the user for manual validation. Any inaccuracies or other issues may be easily identifiable in the graphical representation. In some implementations, the artifacts may be deconstructed to a high-level description that a user (e.g., a cloud architect or other human inspectors) can easily read and inspect.

Checkpoint image store engine 123 may generate and/or store a checkpoint image of the cloud model. The "checkpoint image," as used herein, may comprise at least a portion of the cloud definition data and/or at least a portion of the cloud configuration data. In other words, the checkpoint image may include all of the cloud definition data, a portion of the cloud definition data, all of the cloud configuration data, and/or a portion of the cloud configuration data. The checkpoint image may be stored in a data storage (e.g., data storage 129). In some implementations, a plurality of checkpoint images (e.g., including different portions of the cloud definition or configuration data, including updated cloud definition data, etc.) may be generated for the same cloud model.

In some implementations, checkpoint image store engine 123 may manage changes (e.g., adding, deleting, modifying, updating, etc.) to the checkpoint image via version-control. Any changes to the checkpoint image may be tracked using version-control. For example, the checkpoint image may be checked-out by a user so that no other users can make changes to the image. The user may subsequently check-in the image to commit the changes the user made to the image. The version-control may track the identification of the user who made the changes, a timestamp associated with the changes, a duration of the check-out, a version number, and/or other modification history related to the image. In addition, the version-control may also provide a capability to rollback any changes made to the checkpoint image.

Difference determine engine 124 may determine a difference between at least two checkpoint images. For example, difference determine engine 124 may determine a difference between a first checkpoint image (e.g., of the first cloud model generated based on the first cloud definition data that describe the first cloud infrastructure) and a second checkpoint image (e.g., of the second cloud model generated based on the second cloud definition data that describe the second cloud infrastructure). In doing so, difference determine engine 124 may compare the first checkpoint image with the second checkpoint image to identify at least one artifact in one of the first and second checkpoint images that is different from the other of the first and second checkpoint images. The difference may comprise at least one artifact that should be added to the first cloud infrastructure that has been already deployed, updated in the first cloud infrastructure, and/or deleted from the first cloud infrastructure.

In some implementations, assuming that the logical network interface data has been updated and two checkpoint images have been generated based on the original logical network interface data and the updated logical network interface data, the difference between the checkpoint images may comprise a portion of the cloud configuration data that is related to the updated logical network interface data. For example, that portion may include artifacts that are related to the updated portions of the logical network interface data.

Such differencing technique may be useful, in some examples, when the first cloud infrastructure has been already deployed but the second cloud infrastructure is now desired in view of the customer's new requirements. In order to deploy the second cloud infrastructure, the access to the cloud (e.g., having the first cloud infrastructure) can be temporarily blocked while the second cloud infrastructure is being deployed and become fully operational. Such downtime may be reduced by executing the difference to deploy the second cloud infrastructure without having to block the access to the cloud.

Deploy engine 125 may execute the cloud model to cause the particular cloud infrastructure to be deployed. The set of artifacts of the cloud model may be executed to build the particular cloud infrastructure. The particular cloud infrastructure may therefore have a cloud architecture that was intended by the cloud definition data. For example, when the cloud model is executed, the set of network interfaces as described in the logical network interface data may be bonded to form a single logical network interface according to the corresponding bond mode.

Different cloud models may be executed to deploy different cloud infrastructure. As discussed above with respect to difference determine engine 124, the determined difference may be executed to update the infrastructure of the cloud from the first cloud infrastructure to the second cloud infrastructure. For example, certain artifacts may be added to the first cloud infrastructure, updated in the first cloud infrastructure, and/or deleted from the first cloud infrastructure. Although the deployment of the first and second cloud models are discussed above, additional cloud models (or differences thereof) may be also executed. For example, deploy engine 125 may execute a difference between the first checkpoint image and a third checkpoint image (e.g., of a third cloud model generated based on third cloud definition data that describe a third cloud infrastructure).

In performing their respective functions, engines 121-125 may access data storage 129 and/or other suitable database (s). Data storage 129 may represent any memory accessible to cloud models system 110 that can be used to store and retrieve data. Data storage 129 and/or other database may comprise random access memory (RAM), read-only memory (ROM), electrically-erasable programmable read-only memory (EEPROM), cache memory, floppy disks, hard disks, optical disks, tapes, solid state drives, flash drives, portable compact disks, and/or other storage media for storing computer-executable instructions and/or data. Cloud models system 110 may access data storage 129 locally or remotely via network 50 or other networks.

Data storage 129 may include a database to organize and store data. The database may reside in a single or multiple physical device(s) and in a single or multiple physical location(s). The database may store a plurality of types of data and/or files and associated data or file description, administrative information, or any other data.

Figure 2:
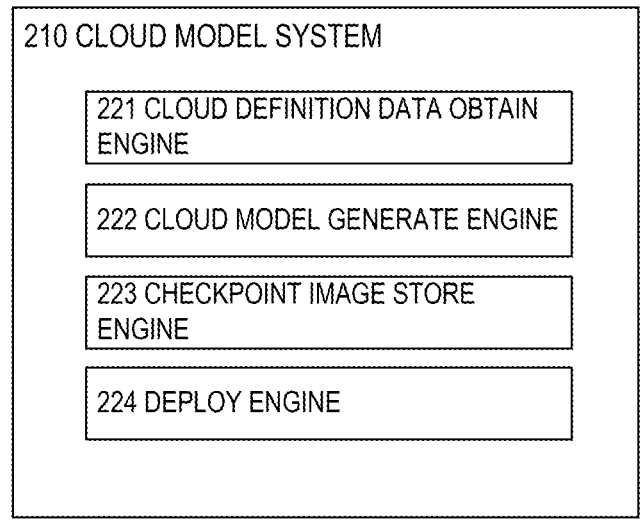
FIG. 2 is a block diagram depicting an example cloud models system.

FIG. 2 is a block diagram depicting an example cloud models system 210. Cloud models system 210 may comprise a cloud definition data obtain engine 221, a cloud model generate engine 222, a checkpoint image store engine 223, a deploy engine 224, and/or other engines. Engines 221-224 represent engines 121, 122, 123, and 125, respectively.

Figure 3:
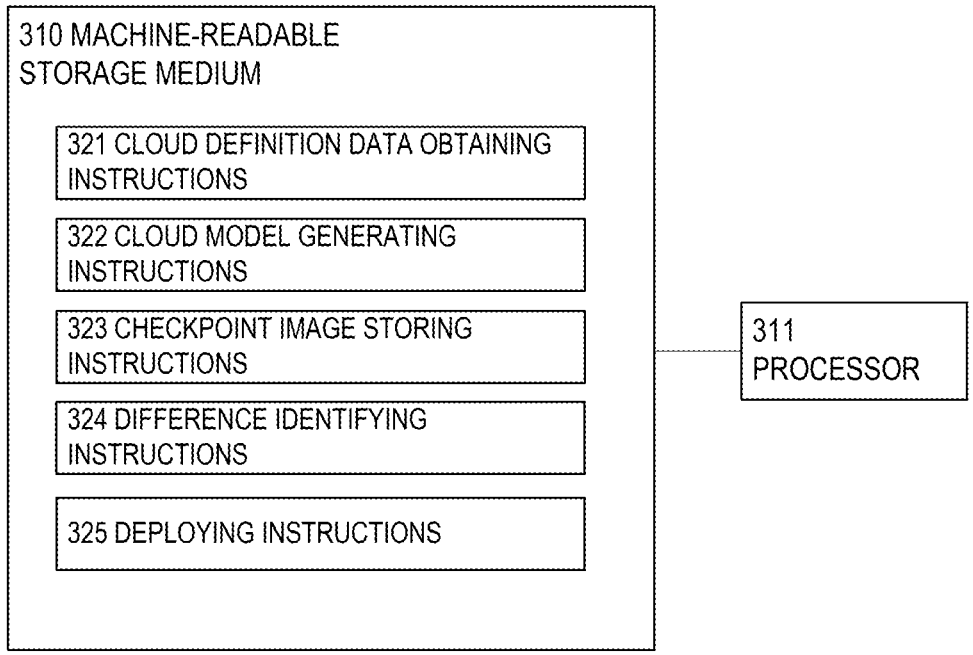
FIG. 3 is a block diagram depicting an example machine-readable storage medium comprising instructions executable by a processor for generating cloud models based on logical network interface data.

FIG. 3 is a block diagram depicting an example machine-readable storage medium 310 comprising instructions executable by a processor for generating cloud models based on logical network interface data.

In the foregoing discussion, engines 121-125 were described as combinations of hardware and programming. Engines 121-125 may be implemented in a number of fashions. Referring to FIG. 3, the programming may be processor executable instructions 321-325 stored on a machine-readable storage medium 310 and the hardware may include a processor 311 for executing those instructions. Thus, machine-readable storage medium 310 can be said to store program instructions or code that when executed by processor 311 implements cloud models system 110 of FIG. 1.

In FIG. 3, the executable program instructions in machine-readable storage medium 310 are depicted as cloud definition data obtaining instructions 321, cloud model generating instructions 322, checkpoint image storing instructions 323, difference identifying instructions 324, and deploying instructions 325. Instructions 321-325 represent program instructions that, when executed, cause processor 311 to implement engines 121-125, respectively.

Figure 4:
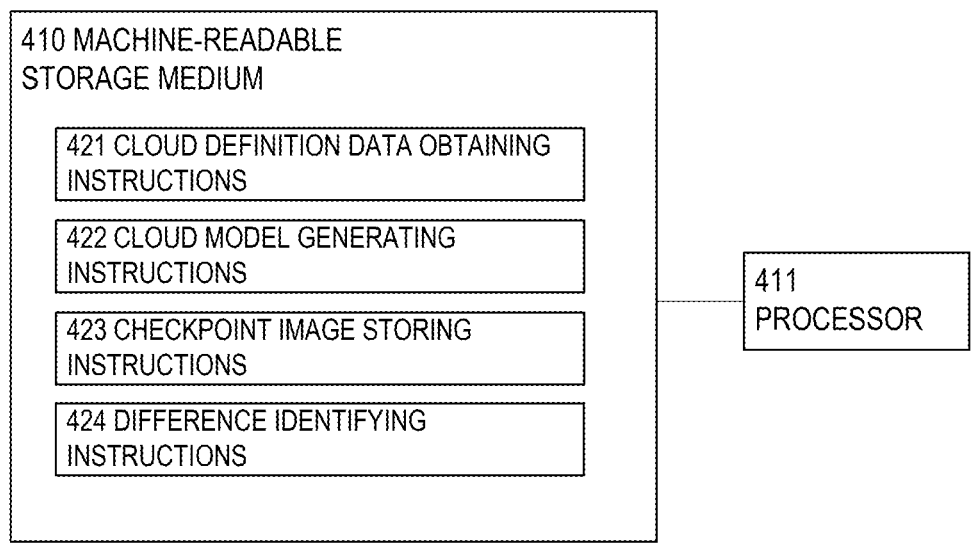
FIG. 4 is a block diagram depicting an example machine-readable storage medium comprising instructions executable by a processor for generating cloud models based on logical network interface data.

FIG. 4 is a block diagram depicting an example machine-readable storage medium 410 comprising instructions executable by a processor for generating cloud models based on logical network interface data.

In the foregoing discussion, engines 121-125 were described as combinations of hardware and programming. Engines 121-125 may be implemented in a number of fashions. Referring to FIG. 4, the programming may be processor executable instructions 421-424 stored on a machine-readable storage medium 410 and the hardware may include a processor 411 for executing those instructions. Thus, machine-readable storage medium 410 can be said to store program instructions or code that when executed by processor 411 implements cloud models system 110 of FIG. 1.

In FIG. 4, the executable program instructions in machine-readable storage medium 410 are depicted as cloud definition data obtaining instructions 421, cloud model generating instructions 422, checkpoint image storing instructions 423, and difference identifying instructions 424. Instructions 421-424 represent program instructions that, when executed, cause processor 411 to implement engines 121-124, respectively.

Machine-readable storage medium 310 (or machine-readable storage medium 410) may be any electronic, magnetic, optical, or other physical storage device that contains or stores executable instructions. In some implementations, machine-readable storage medium 310 (or machine-readable storage medium 410) may be a non-transitory storage medium, where the term "non-transitory" does not encompass transitory propagating signals. Machine-readable storage medium 310 (or machine-readable storage medium 410) may be implemented in a single device or distributed across devices. Likewise, processor 311 (or processor 411) may represent any number of processors capable of executing instructions stored by machine-readable storage medium 310 (or machine-readable storage medium 410). Processor 311 (or processor 411) may be integrated in a single device or distributed across devices. Further, machine-readable storage medium 310 (or machine-readable storage medium 410) may be fully or partially integrated in the same device as processor 311 (or processor 411), or it may be separate but accessible to that device and processor 311 (or processor 411).

In one example, the program instructions may be part of an installation package that when installed can be executed by processor 311 (or processor 411) to implement cloud models system 110. In this case, machine-readable storage medium 310 (or machine-readable storage medium 410) may be a portable medium such as a floppy disk, CD, DVD, or flash drive or a memory maintained by a server from which the installation package can be downloaded and installed. In another example, the program instructions may be part of an application or applications already installed. Here, machine-readable storage medium 310 (or machine-readable storage medium 410) may include a hard disk, optical disk, tapes, solid state drives, RAM, ROM, EEPROM, or the like.

Processor 311 may be at least one central processing unit (CPU), microprocessor, and/or other hardware device suitable for retrieval and execution of instructions stored in machine-readable storage medium 310. Processor 311 may fetch, decode, and execute program instructions 321-325, and/or other instructions. As an alternative or in addition to retrieving and executing instructions, processor 311 may include at least one electronic circuit comprising a number of electronic components for performing the functionality of at least one of instructions 321-325, and/or other instructions.

Processor 411 may be at least one central processing unit (CPU), microprocessor, and/or other hardware device suitable for retrieval and execution of instructions stored in machine-readable storage medium 410. Processor 411 may fetch, decode, and execute program instructions 421-424, and/or other instructions. As an alternative or in addition to retrieving and executing instructions, processor 411 may include at least one electronic circuit comprising a number of electronic components for performing the functionality of at least one of instructions 421-424, and/or other instructions.

Figure 5:
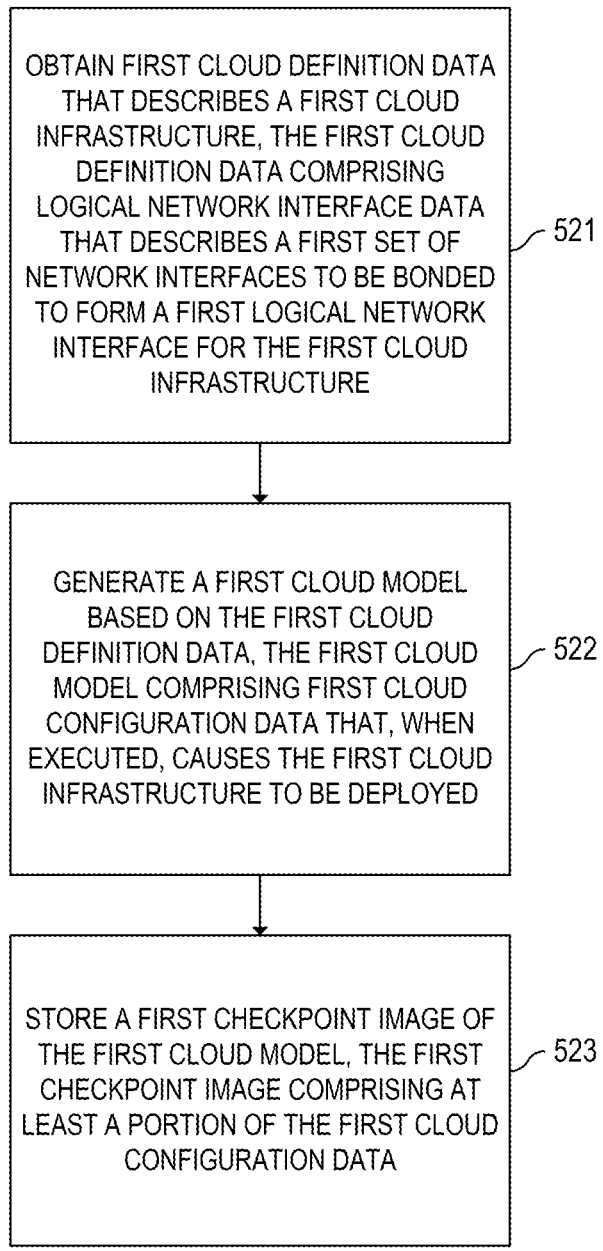
FIG. 5 is a flow diagram depicting an example method for generating cloud models based on logical network interface data.

FIG. 5 is a flow diagram depicting an example method 500 for generating cloud models based on logical network interface data. The various processing blocks and/or data flows depicted in FIG. 5 (and in the other drawing figures such as FIG. 6) are described in greater detail herein. The described processing blocks may be accomplished using some or all of the system components described in detail above and, in some implementations, various processing blocks may be performed in different sequences and various processing blocks may be omitted. Additional processing blocks may be performed along with some or all of the processing blocks shown in the depicted flow diagrams. Some processing blocks may be performed simultaneously. Accordingly, method 500 as illustrated (and described in greater detail below) is meant be an example and, as such, should not be viewed as limiting. Method 500 may be implemented in the form of executable instructions stored on a machine-readable storage medium, such as storage medium 310, and/or in the form of electronic circuitry.

In block 521, method 500 may include obtaining first cloud definition data that describes a first cloud infrastructure. The first cloud definition data may comprise logical network interface data that describes a first set of network interfaces to be bonded to form a first logical network interface for the first cloud infrastructure. Referring back to FIG. 1, cloud definition data obtain engine 121 may be responsible for implementing block 521.

In block 522, method 500 may include generating a first cloud model based on the first cloud definition data. The first cloud model may comprise first cloud configuration data that, when executed, causes the first cloud infrastructure to be deployed. Referring back to FIG. 1, cloud model generate engine 122 may be responsible for implementing block 522.

In block 523, method 500 may include storing a first checkpoint image of the first cloud model. The first checkpoint image may comprise at least a portion of the first cloud configuration data. Referring back to FIG. 1, checkpoint image store engine 123 may be responsible for implementing block 523.

Figure 6:
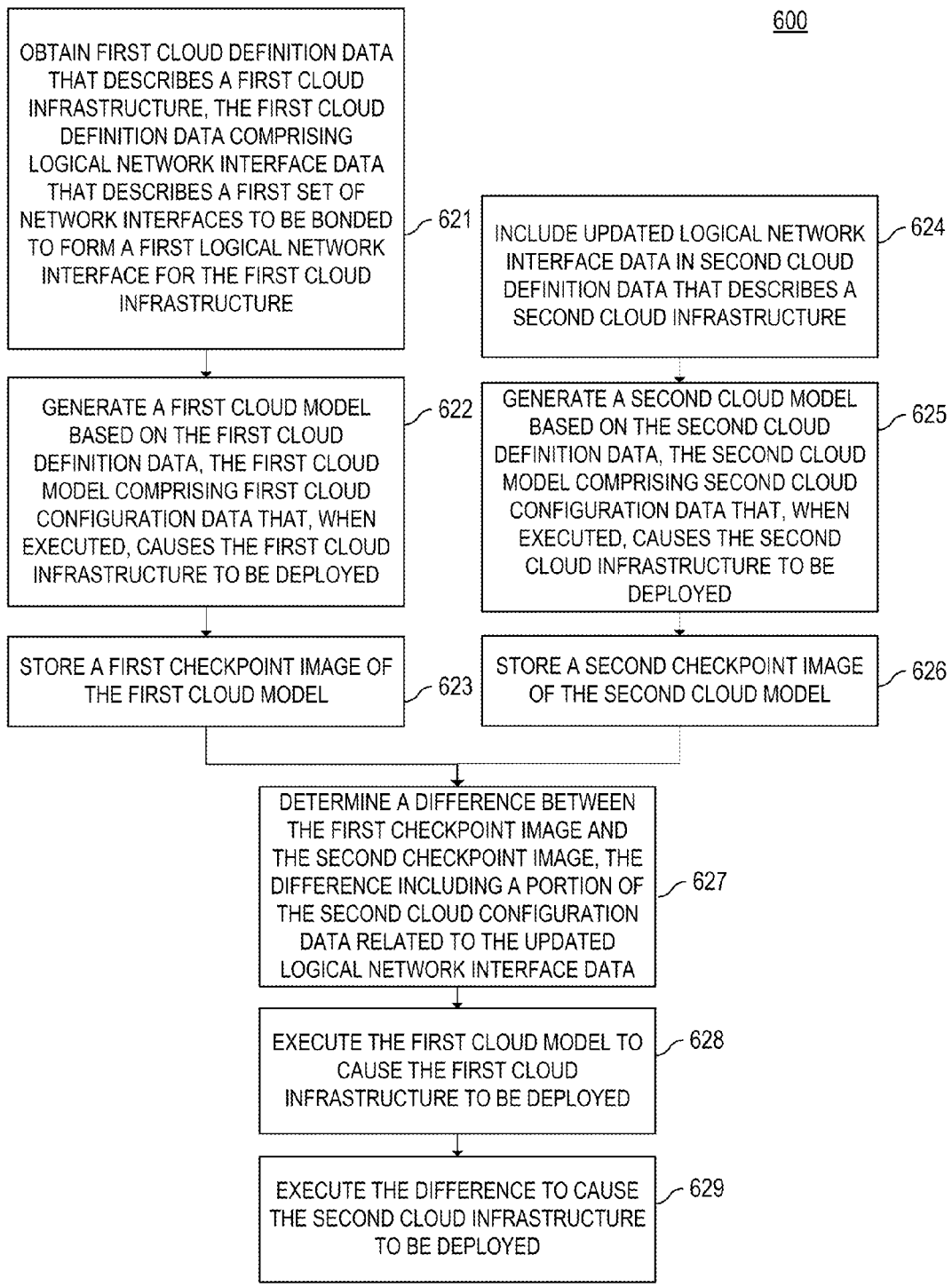
FIG. 6 is a flow diagram depicting an example method for generating cloud models based on logical network interface data.

FIG. 6 is a flow diagram depicting an example method 600 for generating cloud models based on logical network interface data. Method 600 as illustrated (and described in greater detail below) is meant be an example and, as such, should not be viewed as limiting. Method 600 may be implemented in the form of executable instructions stored on a machine-readable storage medium, such as storage medium 210, and/or in the form of electronic circuitry.

Blocks 621-623 are discussed above in blocks 521-523 of FIG. 5.

In block 624, method 600 may include including updated logical network interface data in second cloud definition data that describe a second cloud infrastructure. The updated logical network interface data may be an updated version of the logical network interface data obtained in block 621. Referring back to FIG. 1, cloud definition data obtain engine 121 may be responsible for implementing block 624.

In block 625, method 600 may include generating a second cloud model based on the second cloud definition data. The second cloud model may comprise second cloud configuration data that, when executed, causes the second cloud infrastructure to be deployed. Referring back to FIG. 1, cloud model generate engine 122 may be responsible for implementing block 625.

In block 626, method 600 may include storing a second checkpoint image of the second cloud model. Referring back to FIG. 1, checkpoint image store engine 123 may be responsible for implementing block 626.

In block 627, method 600 may include determining a difference between the first checkpoint image and the second checkpoint image. The difference may include a portion of the second cloud configuration data related to the updated logical network interface data. Referring back to FIG. 1, difference determine engine 124 may be responsible for block 627.

In block 628, method 600 may include executing the first cloud model to cause the first cloud infrastructure to be deployed. In block 629, method 600 may include executing the difference to cause the second cloud infrastructure to be deployed. Referring back to FIG. 1, deploy engine 125 may be responsible for blocks 628 and 629.

The foregoing disclosure describes a number of example implementations for cloud models based on logical network interface data. The disclosed examples may include systems, devices, computer-readable storage media, and methods for generating cloud models based on logical network interface data. For purposes of explanation, certain examples are described with reference to the components illustrated in FIGS. 1-4. The functionality of the illustrated components may overlap, however, and may be present in a fewer or greater number of elements and components.

Further, all or part of the functionality of illustrated elements may co-exist or be distributed among several geographically dispersed locations. Moreover, the disclosed examples may be implemented in various environments and are not limited to the illustrated examples. Further, the sequence of operations described in connection with FIGS. 5-6 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

The invention claimed is:

1. A method for generating cloud models based on logical network interface data, the method comprising:
obtaining first cloud definition data that describes a first cloud infrastructure, the first cloud definition data comprising logical network interface data that describes a first set of network interfaces to be bonded to form a first logical network interface for the first cloud infrastructure;
generating a first cloud model based on the first cloud definition data, the first cloud model comprising first cloud configuration data that, when executed, causes the first cloud infrastructure to be deployed; and
storing a first checkpoint image of the first cloud model, the first checkpoint image comprising at least a portion of the first cloud configuration data.

2. The method of claim 1, wherein obtaining the first cloud definition data comprises:
obtaining a bond mode for the first set of network interfaces, the bond mode comprising at least one of: a first mode related to load balancing and a second mode related to fault tolerance.

3. The method of claim 2, further comprising:
executing the first cloud model to cause the first cloud infrastructure to be deployed.

4. The method of claim 3, wherein the first set of network interfaces are bonded to form the first logical network interface according to the bond mode.

5. The method of claim 1, further comprising:
updating the logical network interface data such that the updated logical network interface data describes a second server device to be included in the first cloud infrastructure and a second set of network interfaces to be bonded to form a second logical network interface for the second server device;
including the updated logical network interface data in second cloud definition data that describes a second cloud infrastructure;
generating a second cloud model based on the second cloud definition data, the second cloud model comprising second cloud configuration data that, when executed, causes the second cloud infrastructure to be deployed; and
storing a second checkpoint image of the second cloud model, the second checkpoint image comprising at least a portion of the second cloud configuration data.

6. The method of claim 5, further comprising:
determining a difference between the first checkpoint image and the second checkpoint image, the difference including a portion of the second cloud configuration data related to the updated logical network interface data;
executing the first cloud model to cause the first cloud infrastructure to be deployed; and
executing the difference to cause the second cloud infrastructure to be deployed.

7. The method of claim 1, wherein the first cloud definition data comprises network topology, server lists, operating systems, software applications, and any combination thereof.

8. The method of claim 1, wherein the first cloud configuration data comprises a set of artifacts that are suitable for the deployment.

9. A non-transitory machine-readable storage medium comprising instructions executable by a processor of a computing device for generating cloud models based on logical network interface data, the machine-readable storage medium comprising:
instructions to obtain cloud definition data comprising logical network interface data that describes a first logical network interface comprising a first set of physical network interfaces to be bonded in a particular cloud infrastructure;
instructions to generate a cloud model based on the cloud definition data, the cloud model comprising cloud configuration data that, when executed, causes the particular cloud infrastructure to be deployed;
instructions to store a first checkpoint image of the cloud model;
instructions to update the cloud definition data by describing a second logical network interface comprising a second set of physical network interfaces to be bonded in the particular cloud infrastructure;
instructions to update the cloud model based on the updated cloud definition data; and
instructions to store a second checkpoint image of the cloud model; and
instructions to identify a difference between the first and second checkpoint images, the difference including a portion of the cloud configuration data related to the second logical network interface.

10. The non-transitory machine-readable storage medium of claim 9, further comprising:
instructions to deploy the particular cloud infrastructure by executing the cloud model; and instructions to update the particular cloud infrastructure by executing the difference.

11. The non-transitory machine-readable storage medium of claim 10, wherein the instructions to deploy the particular cloud infrastructure by executing the cloud model comprise:
instructions to generate the first logical network interface in the particular cloud infrastructure.

12. The non-transitory machine-readable storage medium of claim 10, wherein the instructions to update the particular cloud infrastructure by executing the difference comprise:
instructions to generate the second logical network interface in the particular cloud infrastructure.

13. The non-transitory machine-readable storage medium of claim 9, wherein a physical network interface of the first or second set of network interfaces comprises a network interface card (NIC).

14. The non-transitory machine-readable storage medium of claim 9, the first logical network interface connects a particular node to a network of the particular cloud infrastructure, the particular node comprising at least one of a compute node, a storage node, and a controller node in the particular cloud infrastructure.

15. A system for generating cloud models based on logical network interface data, the system comprising:
a processor that:
obtains first cloud definition data that describes a first cloud infrastructure, the first cloud definition data comprising logical network interface data that describes a first set of network interfaces to be bonded to form a first logical network interface for the first cloud infrastructure;
obtains second cloud definition data that describes a second cloud infrastructure, the second cloud definition data comprising a modified version of the logical network interface data;
generates a first cloud model based on the first cloud definition data, the first cloud model comprising first cloud configuration data that, when executed, causes the first cloud infrastructure to be deployed;
generates a second cloud model based on the second cloud definition data, the second cloud model comprising second cloud configuration data that, when executed, causes the second cloud infrastructure to be deployed;
stores a first checkpoint image of the first cloud model and a second checkpoint image of the second cloud model;
executes the first cloud model to cause the first cloud infrastructure to be deployed; and
executes a difference between the first checkpoint image and the second checkpoint image to cause the second cloud infrastructure to be deployed, the difference including a portion of the second configuration data that is related to the modified version of the logical network interface data.

16. The system of claim 15, the processor that:
obtains a bond mode for the first set of network interfaces, the bond mode comprising at least one of: a first mode related to load balancing and a second mode related to fault tolerance;
includes the bond mode in the first logical network interface data; and
executes the first cloud model to cause the first cloud infrastructure to be deployed, wherein the first set of network interfaces are bonded to form the first logical network interface according to the bond mode.

17. The system of claim 15, wherein executing the difference comprises:
comparing the first checkpoint image with the second checkpoint image to identify at least one artifact in one of the first and second checkpoint images that is different from the other of the first and second checkpoint images.

18. The system of claim 15, wherein the difference comprises at least one artifact that should be added to the first cloud infrastructure, updated in the first cloud infrastructure, or deleted from the first cloud infrastructure that has been deployed.

19. The system of claim 18, wherein the first or second cloud configuration data includes at least one of a network artifact, a configuration management artifact, a monitoring artifact.

* * * * *